US012334788B2

(12) United States Patent
Ripplinger et al.

(10) Patent No.: US 12,334,788 B2
(45) Date of Patent: Jun. 17, 2025

(54) STATOR CONNECTION CONFIGURATIONS

(71) Applicant: Hamilton Sundstrand Corporation, Charlotte, NC (US)

(72) Inventors: Skyler Ripplinger, Rockford, IL (US); Andreas C. Koenig, Rockford, IL (US); Glenn C. Lemmers, Jr., Loves Park, IL (US); Joshua J. Krecklow, Leaf River, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 287 days.

(21) Appl. No.: 18/122,939

(22) Filed: Mar. 17, 2023

(65) Prior Publication Data

US 2024/0313601 A1 Sep. 19, 2024

(51) Int. Cl.
*H02K 3/28* (2006.01)
(52) U.S. Cl.
CPC ........... *H02K 3/28* (2013.01); *H02K 2203/06* (2013.01); *H02K 2203/09* (2013.01)
(58) Field of Classification Search
CPC ... H02K 3/28; H02K 2203/06; H02K 2203/09
See application file for complete search history.

(56) References Cited

U.S. PATENT DOCUMENTS

| 8,471,419 | B2 | 6/2013 | Shimomura et al. |
| 10,505,424 | B2 | 12/2019 | Tamura et al. |
| 2012/0228982 | A1 | 9/2012 | Kimiabeigi |
| 2021/0408862 | A1 | 12/2021 | Jensen et al. |

FOREIGN PATENT DOCUMENTS

| DE | 202005011721 U1 | * | 1/2007 | ............. H02K 11/33 |
| WO | WO-2006050765 A1 | * | 5/2006 | ............. H02K 3/522 |
| WO | WO-2009025144 A1 | * | 2/2009 | ............. H02K 3/522 |

OTHER PUBLICATIONS

European Search Report dated Sep. 10, 2024 in connection with European Patent Application No. 24163791.7, 9 pages.

* cited by examiner

*Primary Examiner* — Mohamad A Musleh

(57) ABSTRACT

An electric machine includes a stator winding in a stator having a winding end. A jumper has a main base end that is connected to the winding end. A first terminal branch of the jumper has a first terminal for connecting the stator electrically to a first load. A second terminal branch of the jumper has a second terminal for connecting the stator electrically to a second load. A first electrical conduction path is defined from the winding end, through the jumper to the first terminal branch to the first terminal. A second electrical conduction path is defined from the winding end, through the jumper to the second terminal branch to the second terminal. The first electrical conduction path has an electrical resistance substantially equal to that of the second electrical conduction path for electrical load balancing from the winding end to the first and second terminals.

15 Claims, 9 Drawing Sheets

STATOR CONNECTION CONFIGURATIONS

BACKGROUND

1. Field

The present disclosure relates to electric machines such as motors and generators, and more particularly to input/output terminals for the phases of electric machines.

2. Description of Related Art

Electric machines such as motors and generators have stators that remain stationary relative to a rotating rotor. Typically, energy extracted from the generator, for example, can be accessed by connecting electrical feeders to the terminals of the stator. Each terminal is in turn connected to a respective jumper, which electrically connects one or more windings of the stator. Each jumper is connected to corresponding stator windings that coincide with a single electrical phase based on the motion of the rotor and its magnetic field.

The conventional techniques have been considered satisfactory for their intended purpose. However, there is an ever present need for improved systems and methods for stator connection configurations. This disclosure provides a solution for this need.

SUMMARY

An electric machine includes a stator winding in a stator having a winding end. A jumper has a main base end that is connected to the winding end. A first terminal branch has a branch end electrically connected to a second end of the jumper. A first terminal is electrically connected to a terminal connection end of the first terminal branch for connecting the stator electrically to a first load. A second terminal branch has a branch end electrically connected to the second end of the jumper. A second terminal is electrically connected to a terminal connection end of the second terminal branch for connecting the stator electrically to a second load. A first electrical conduction path is defined from the winding end, through the jumper to the first terminal branch to the first terminal. A second electrical conduction path is defined from the winding end, through the jumper to the second terminal branch to the second terminal. The first electrical conduction path has an electrical resistance substantially equal to that of the second electrical conduction path for electrical load balancing from the winding end to the first and second terminals.

The first electrical conduction path can have a length substantially equal to that of the second electrical conduction path. A first main branch of the jumper can be defined from the main base end to the second end of the jumper. A second main branch of the jumper can extend from the main base end to a third end of the jumper. A third terminal branch can have a branch end electrically connected to the third end of the jumper. A third terminal can be electrically connected to a terminal connection end of the third terminal branch for connecting the stator electrically to a third load. A third electrical conduction path can be defined from the winding end, through the second main branch of the jumper to the third terminal branch to the third terminal. The third electrical conduction path can have an electrical resistance substantially equal to that of the second electrical conduction path for electrical load balancing from the winding end to the first, second, and third terminals. The third electrical conduction path can have a length substantially equal to that of the second electrical conduction path.

A fourth terminal branch can have a branch end electrically connected to the third end of the jumper. A fourth terminal can be electrically connected to a terminal connection end of the fourth terminal branch for connecting the stator electrically to a fourth load. A fourth electrical conduction path can be defined from the winding end, through the second main branch of the jumper to the fourth terminal branch to the fourth terminal. The fourth electrical conduction path can have an electrical resistance substantially equal to that of the third electrical conduction path for electrical load balancing from the winding end to the first, second, third, and fourth terminals. The fourth electrical conduction path can have a length substantially equal to that of the second electrical conduction path.

A second stator winding in the stator can have a second winding end. A second jumper can include a respective main base end connected to the second winding end. The second jumper can include a respective first terminal branch, a respective first terminal, a respective second terminal branch, and a respective second terminal as described above for the first jumper.

A third stator winding in the stator can have a third winding end. A third jumper can include a respective main base end connected to the third winding end. The third jumper can include a respective first terminal branch, a respective first terminal, a respective second terminal branch, and a respective second terminal as described above for the first jumper.

The second jumper can include a respective second main branch, a respective third terminal branch, a respective third terminal, a respective fourth terminal branch, and a respective fourth terminal as described above for the first jumper. The third jumper can have a respective second main branch, a respective third terminal branch, a respective third terminal, a respective fourth terminal branch, and a respective fourth terminal as described above for the first jumper.

The first terminals of the first, second, and third jumpers can be circumferentially aligned. The second terminals of the first, second, and third jumpers can be circumferentially aligned. The third terminals of the first, second, and third jumpers can be circumferentially aligned. The fourth terminals of the first, second, and third jumpers can be circumferentially aligned. The first winding end can be circumferentially offset from the second winding end. The third winding end can be circumferentially offset from both of the first and second winding ends.

Each of the first, second, and third jumpers can conform to a portion of a ring shape extending circumferentially around the stator. At least one of the first, second, and third jumpers can include a U-turn section wherein the first main branch circumferentially folds back on itself. At least one of the terminal branches can overlap circumferentially over its own respective main branch.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
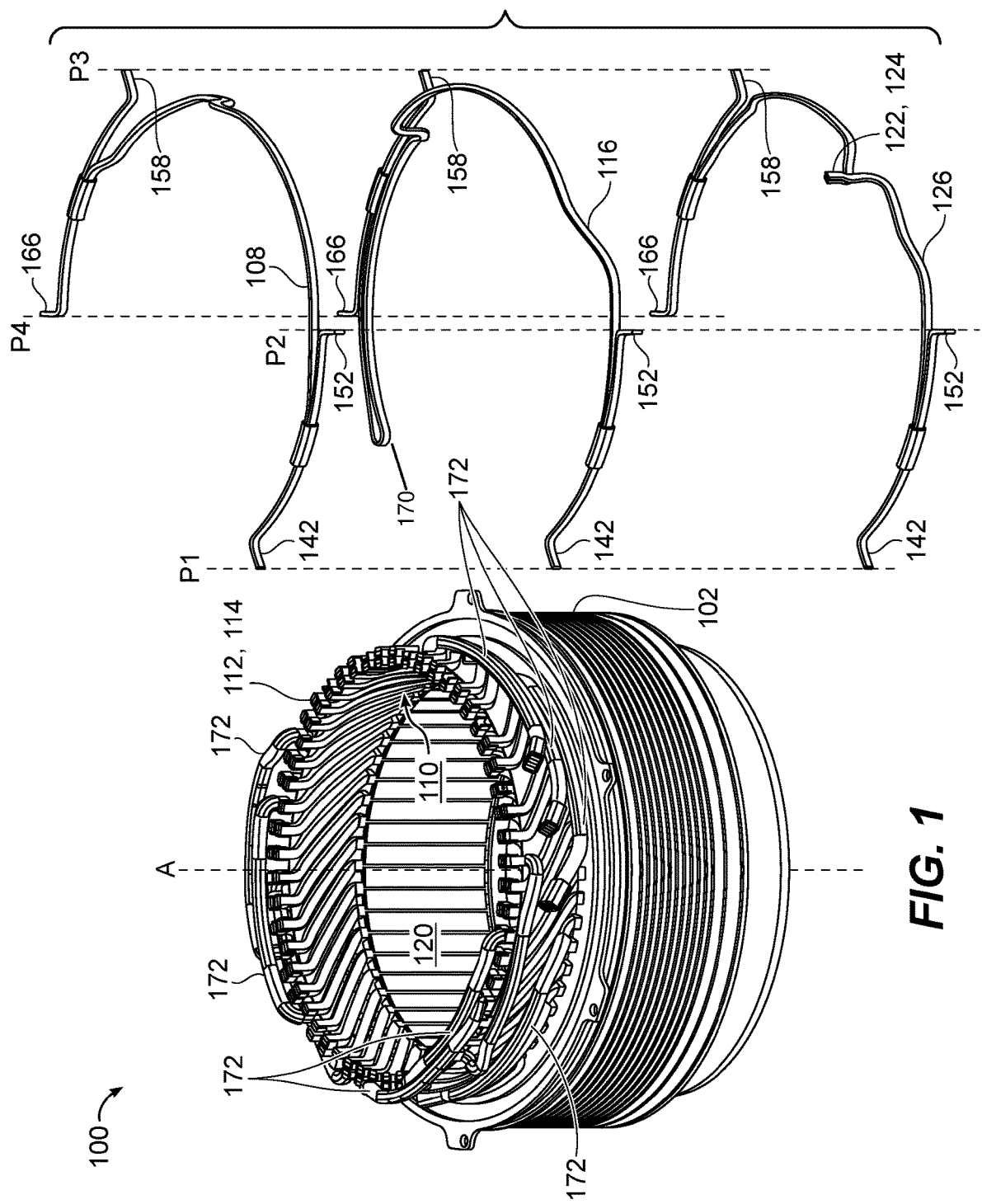
FIG. 1 is an schematic exploded perspective view of an embodiment of an electric machine constructed in accordance with the present disclosure, showing the three jumpers each with four terminals configured for load balanced power delivery to four separate loads.

Reference will now be made to the drawings wherein like reference numerals identify similar structural features or aspects of the subject disclosure. For purposes of explanation and illustration, and not limitation, a partial view of an embodiment of an electric machine in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to provide load balanced connections from an electric machine to external components, such as a generator with four output connections.

Figure 2:
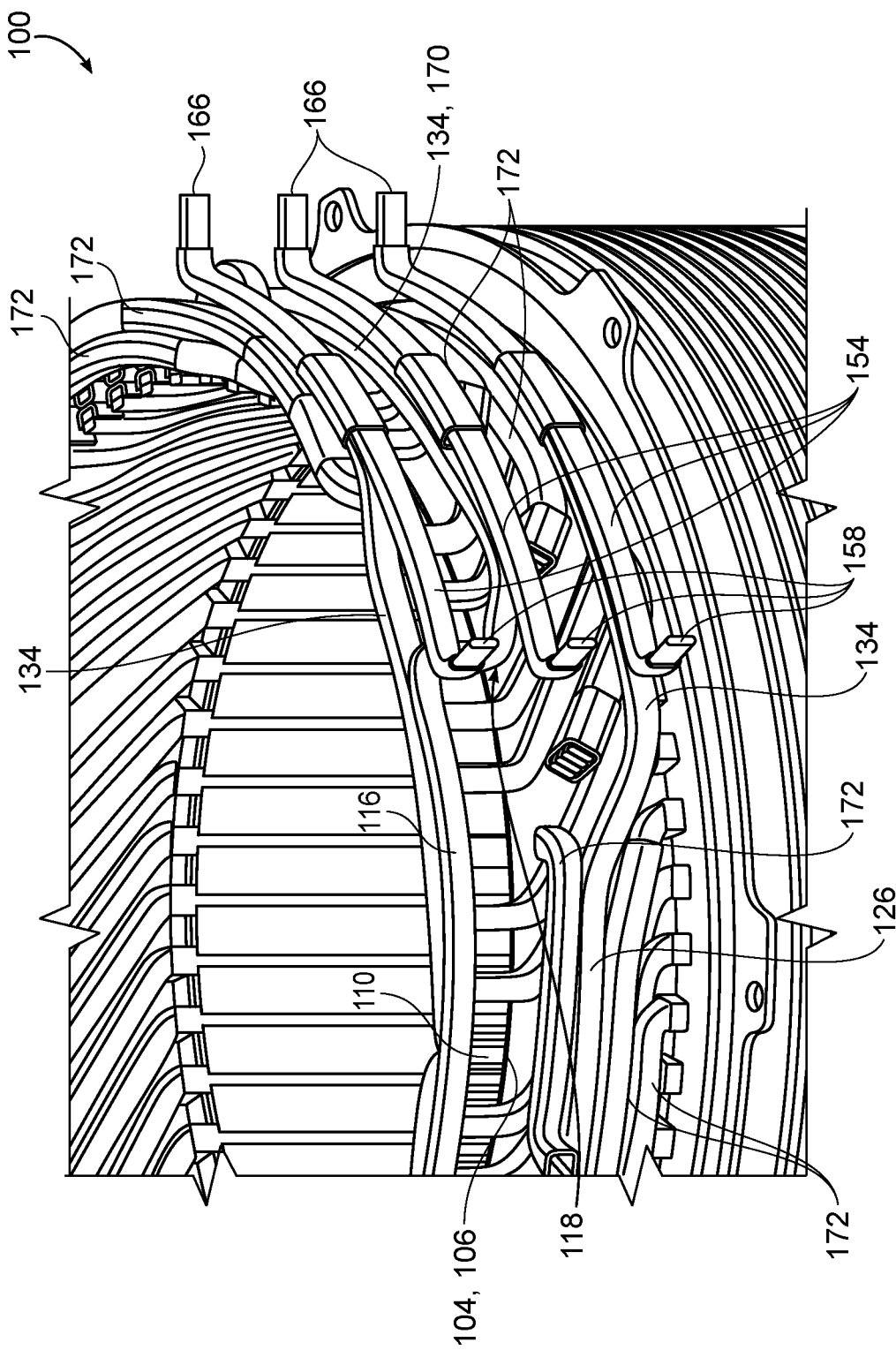
FIG. 2 is a schematic perspective view of the electric machine of FIG. 1, showing the connection of the second jumper and its stator winding.
Figure 3:
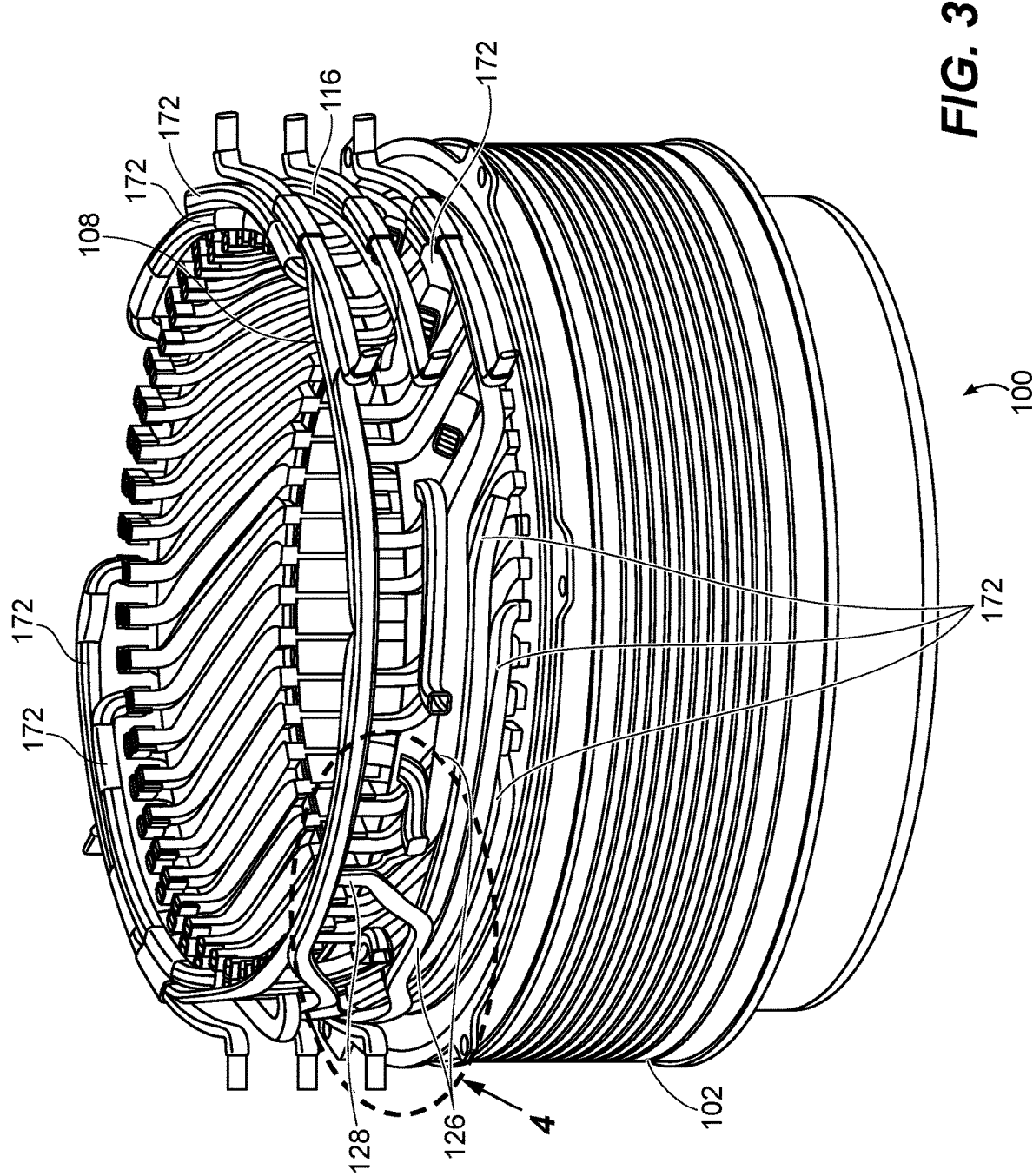
FIG. 3 is a schematic perspective view of the electric machine of FIG. 1, showing the connection of the third jumper and its stator winding.
Figure 4:
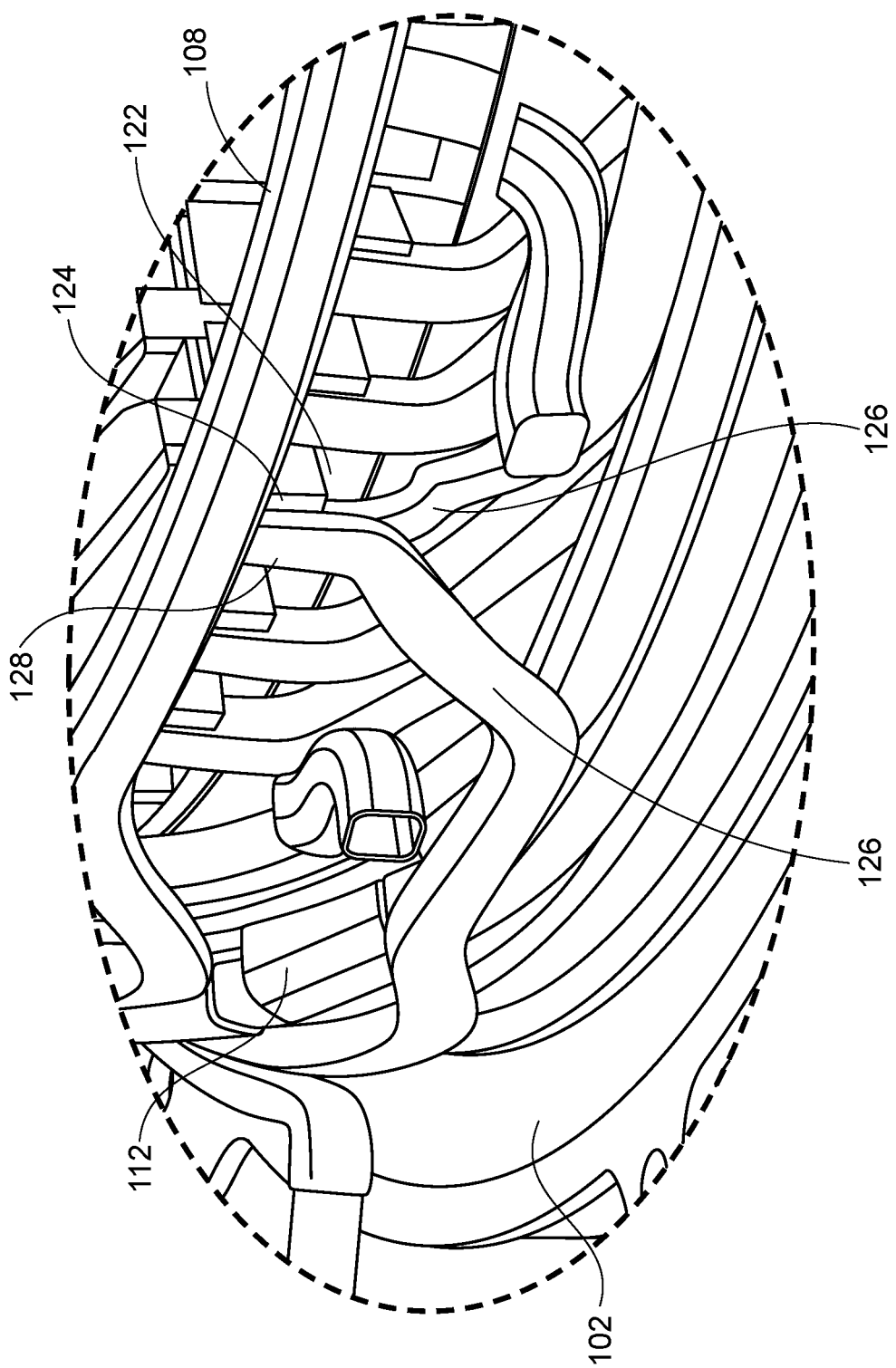
FIG. 4 is a schematic perspective view of a portion of the electric machine of FIG. 3, showing the connection of the third jumper and its stator winding.

The electric machine 100 includes a stator 102, e.g. for a generator with a rotor in the space 120 for rotating round the rotation axis A, with a first stator winding 104, for a first electrical/magnetic phase, having a winding end 106 (labeled in FIG. 2). A first jumper 108 has a main base end 110 that is connected to the winding end 106, as shown in FIG. 2. A second stator winding 112 in the stator 102 has a second winding end 114, which is for a second phase. A second jumper 116 includes a respective main base 118 connected to the second winding end 114, as shown in FIG. 2. A third stator winding 122 in the stator has a third winding end 124 for a third phase of the stator 102. A third jumper 126 includes a respective main base 128 connected to the third winding end 124, as shown in FIG. 3, and as shown in close up in FIG. 4. The jumpers 108, 116, 126 can be brazed to their respective winding ends 106, 114, 122. As shown in FIG. 1, the windings 104, 112, 122 can each include inter winding jumpers 172 as needed, however these inter winding jumpers are not included in the terminal jumpers 108, 116, 126.

Figure 5:
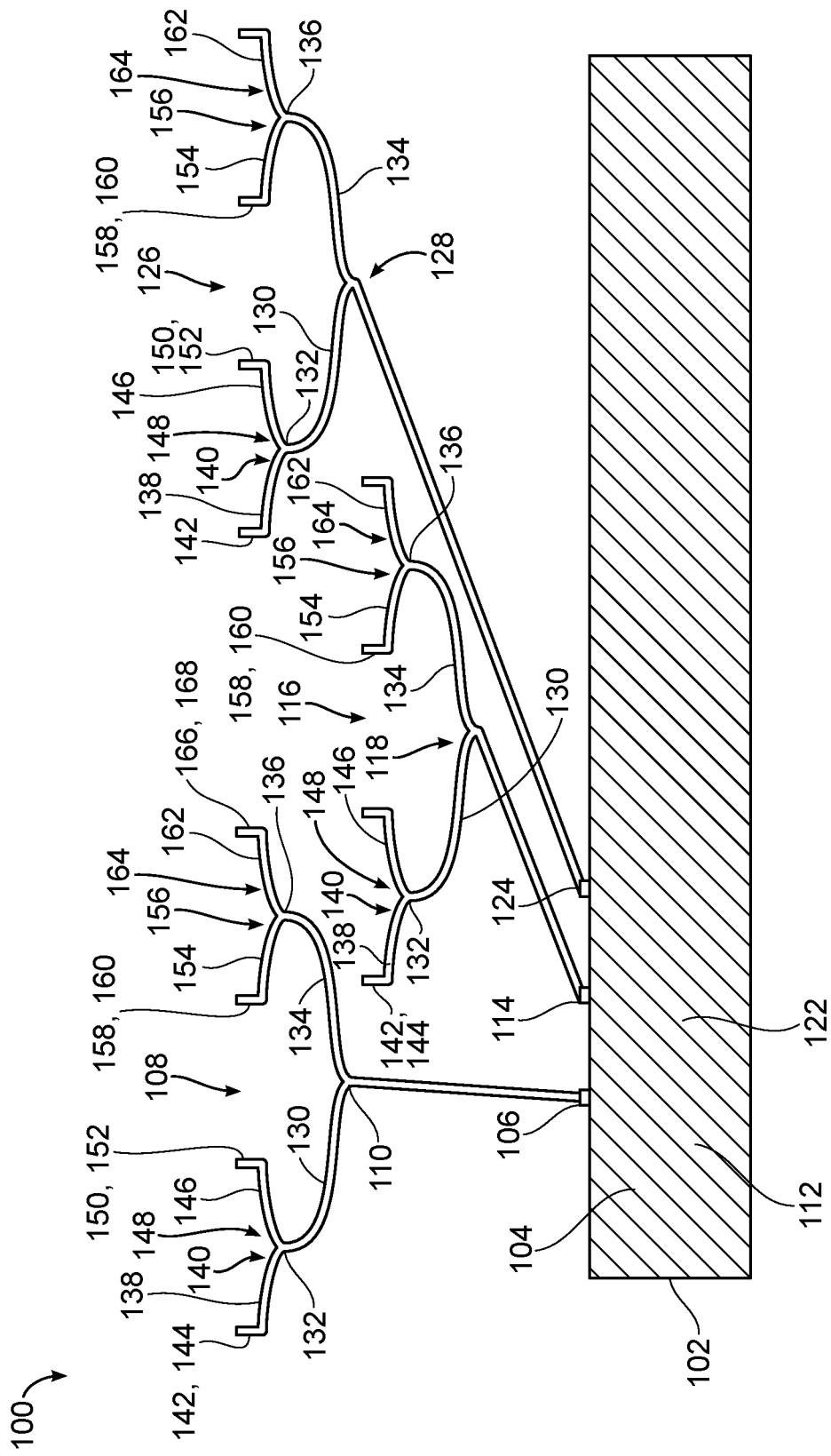
FIG. 5 is schematic view of the electric machine of FIG. 1, showing the three jumpers schematically.

With reference now to FIG. 5, wherein the stator 102 is shown schematically, as are the three jumpers 108, 116, 126, with the respective main base ends 110, 118, 128 are exaggerated in length for schematic purposes. A first main branch 130 of the first jumper 108 is defined from the main base end 110 to the second end 132 of the jumper 108. A second main branch 134 of the jumper 108 extends from the main base end 110 to a third end 136 of the jumper 108.

With continued reference to FIG. 5, a first terminal branch 138 of the first has a branch end 140 that is electrically connected to a second end 132 of the jumper 108. A first terminal 142 is electrically connected to a terminal connection end 144 of the first terminal branch 138 for connecting the stator 102 electrically to a first load, wherein the terminals disclosed herein such as terminal 142 can just be ends of their respective terminal branches, or can be a separate component brazed or soldered to the terminal branch.

With continued reference to FIG. 5, the first jumper 108 includes a second terminal branch 146 which has a branch end 148 electrically connected to the second end 132 of the jumper 108. A second terminal 150 is electrically connected to a terminal connection end 152 of the second terminal branch 146 for connecting the stator 102 electrically to a second load. A third terminal branch 154 has a branch end 156 electrically connected to the third end 136 of the jumper 108. A third terminal 158 is electrically connected to a terminal connection end 160 of the third terminal branch 154 for connecting the stator 102 electrically to a third load. A fourth terminal branch 162 has a branch end 164 electrically connected to the third end 136 of the jumper 108. A fourth terminal 166 is electrically connected to a terminal connection end 168 of the fourth terminal branch 162 for connecting the stator electrically to a fourth load. As labeled in FIG. 5, each of the second and third jumpers 116 and 126 has the same arrangement of main branches 130, 135, first through fourth terminal branches 138, 146, 154, 162, and terminals 142, 150, 158, 166 as described above for the first jumper 108.

Figure 6:
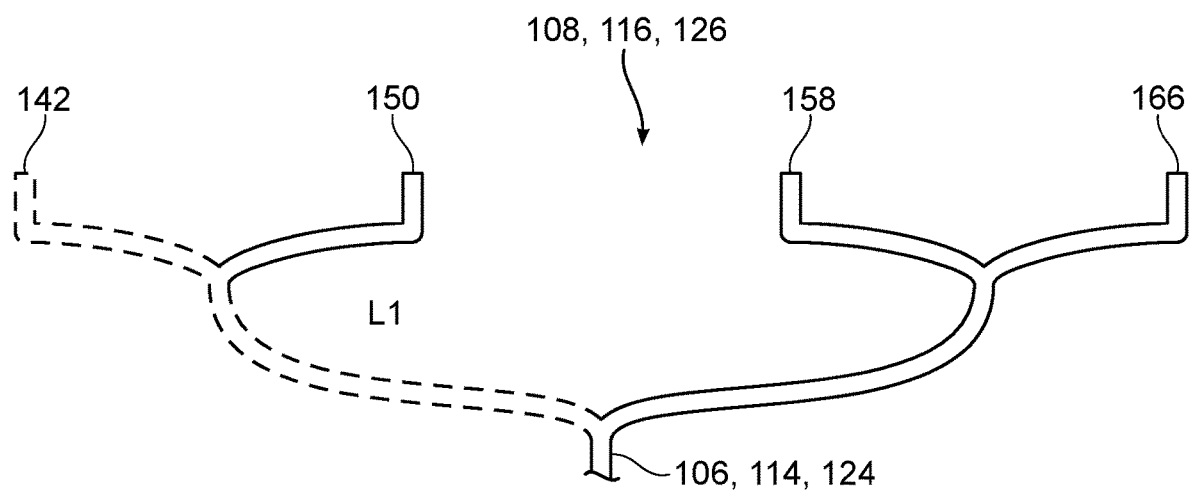
FIGS. 6-9 are schematic views of one of the jumpers of FIG. 5, showing the electrical conduction paths from the main base end of the jumper to the first through fourth terminals, respectively.
Figure 7:
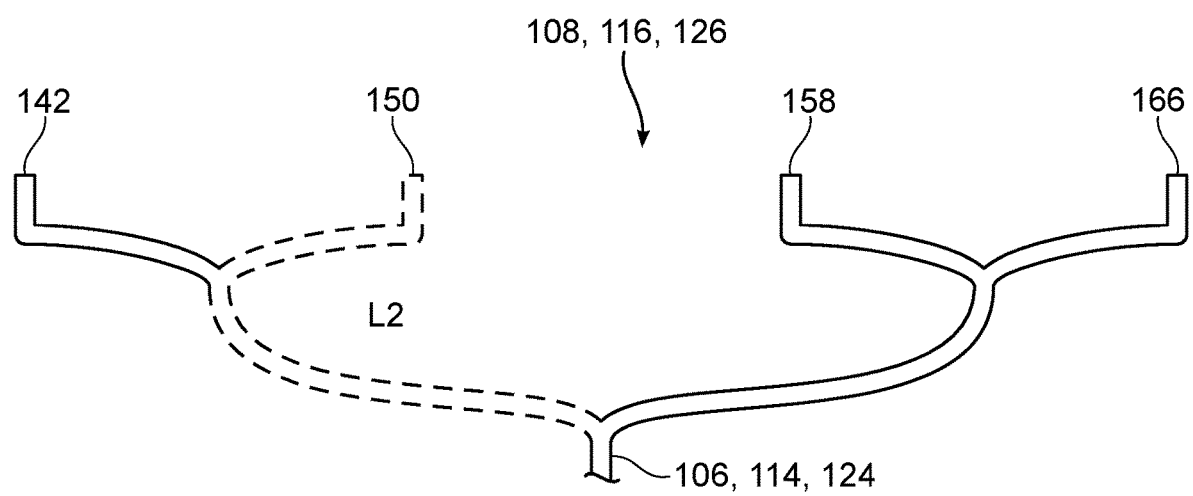

With reference now to FIGS. 6 and 7, for each of the jumpers 108, 116, 126 a first electrical conduction path L1, indicated in broken lines in FIG. 6, is defined from the winding end 106, 114, 124, through the first main branch 130 of the jumper 108, 118, 126 to the first terminal branch 138 and to the first terminal 142. As indicated by the broken lines in FIG. 7, a second electrical conduction path L2 is defined from the winding end 106, 114, 124, through second main branch 134 of the jumper 108, 118, 126 to the second terminal branch 146 and to the second terminal 150. The first electrical conduction path L1 in FIG. 6 has an electrical resistance substantially equal to that of the second electrical conduction path L2 in FIG. 7 for electrical load balancing from the winding ends 106, 114, 124 to the first and second terminals 142, 150 in each jumper 108, 116, 126. The first electrical conduction path L1 can have a length substantially equal to that of the second electrical conduction path L2. Those skilled in the art will readily appreciate that substantially equal as used herein means as equal as needed to achieve a set percentage of load balancing as required by performance specifications, not necessarily perfectly equal.

Figure 8:
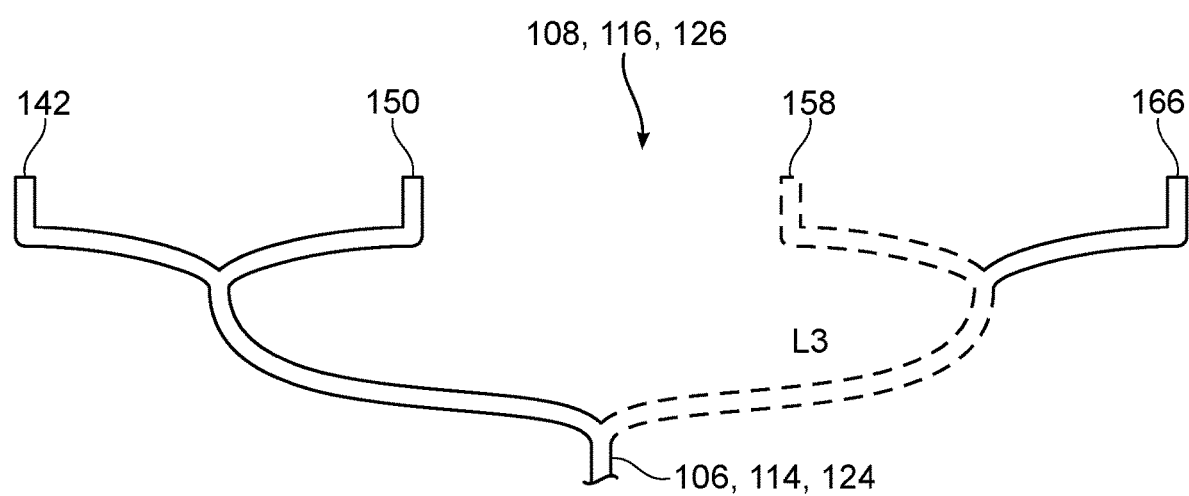

With reference now to FIG. 8, each jumper 108, 118, 126 includes a third electrical conduction path L3, indicated in broken lines, that is defined from the winding end 106, 114, 124, through the second main branch 134 of the jumper 108, 118, 126 to the third terminal branch 154 and to the third terminal 158. The third electrical conduction path L3 has an electrical resistance substantially equal to that of the second electrical conduction path L2, and thus to path L1 as well, (L2 and L1 are labeled in FIGS. 6 and 7) for electrical load balancing from the winding ends 106, 114, 124 to the first, second, and third terminals 142, 150, 158. The third electrical conduction path L2 has a length substantially equal to that of the second electrical conduction path L2, and thus to path L1 as well, (L2 and L1 are labeled in FIGS. 6 and 7).

Figure 9:
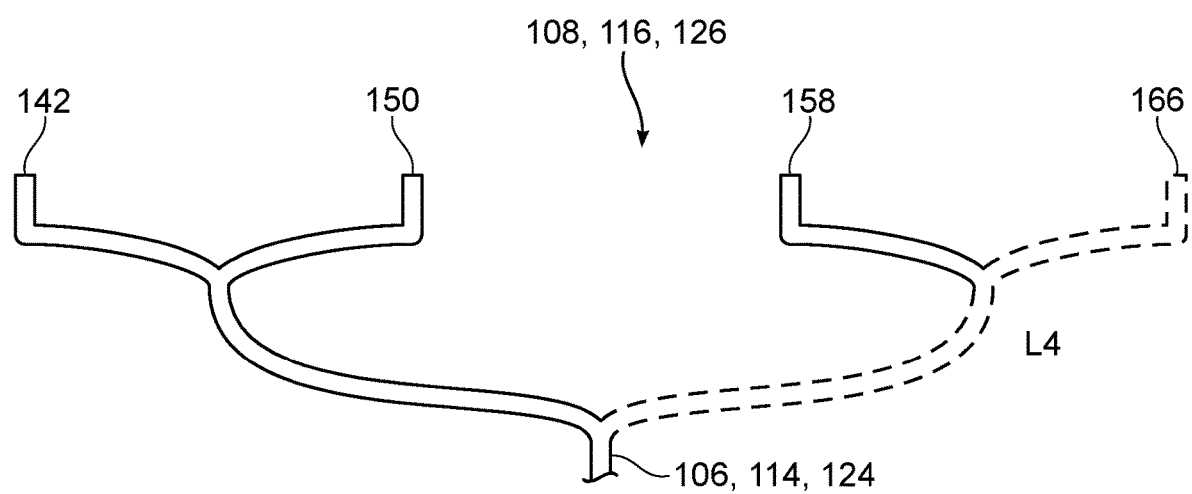

With reference now to FIG. 9, each jumper 108, 118, 126 includes a fourth electrical conduction path L4, indicated in broken lines, that is defined from the winding end 106, 114, 124, through the second main branch 134 of the jumper 108, 118, 126 to the fourth terminal branch 162 and to the fourth terminal 166. The fourth electrical conduction path L4 has an electrical resistance substantially equal to that of the first, second, and third electrical conduction paths L1, L2, L3 labeled in FIGS. 6-8 for electrical load balancing from the winding ends 106, 114, 124 to the first, second, third, and fourth terminals 142, 150, 158, 166. The fourth electrical conduction path L4 has a length substantially equal to that of the first, second, and third electrical conduction paths L1, L2, L3 labeled in FIGS. 6-8.

With reference again to FIG. 1, The first terminals each of the jumpers 108, 116, 126 are circumferentially aligned, i.e. to the same clock position P1 around the rotation axis A, for connection of all three phases of the stator 102 to a first load. The second terminals 152 of the jumpers 108, 116, 126 are circumferentially aligned to the same clock position P2 for connection of all three phases of the stator 102 to a second load. The third terminals 158 of the jumpers 108, 116, 126 are circumferentially aligned to the same clock position P3 for connection of all three phases of the stator to a third load. The fourth terminals 166 of the jumpers 108, 116, 126 are circumferentially aligned to the same clock position P4 for connection of all three phases of the stator to a fourth load. Each of the clock positions P1, P2, P3, P4 is circumferentially spaced apart from the others to provide spacing to connect the loads. The first winding end 106 (labeled in FIG. 2) is circumferentially offset from the second winding end 114 (labeled in FIG. 1). The third winding end 124 (labeled in FIGS. 3-4) is circumferentially offset from both of the first and second winding ends 106, 114 (labeled in FIGS. 1 and 2).

As shown in FIG. 1, each of the jumpers 108, 116, 126 conforms to a portion of a ring shape, in other words to a C-shape, extending circumferentially around the stator 102. At least one of the first, second, and third jumpers includes a U-turn section 170, e.g. as labeled in FIG. 2 for the second jumper 116 wherein the second main branch 134 folds back on itself in the circumferential direction. As shown in FIG. 2, this positions the terminals 158, 166 as described above while providing the electrical resistance/length needed in the jumper 116 for load balancing. As needed, terminal branches, e.g. in FIG. 2 terminal branches 154 overlap circumferentially over their own respective main branches 134 in all three jumpers 108, 116, 126.

The methods and systems of the present disclosure, as described above and shown in the drawings, provide for load balanced connections from an electric machine to external components, such as a generator with four output connections. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric machine comprising:
   a stator winding in a stator having a winding end;
   a jumper having a main base end connected to the winding end;
   a first terminal branch having a branch end electrically connected to a second end of the jumper;
   a first terminal electrically connected to a terminal connection end of the first terminal branch for connecting the stator electrically to a first load;
   a second terminal branch having a branch end electrically connected to the second end of the jumper; and
   a second terminal electrically connected to a terminal connection end of the second terminal branch for connecting the stator electrically to a second load,
   wherein a first electrical conduction path is defined from the winding end, through the jumper to the first terminal branch to the first terminal,
   wherein a second electrical conduction path is defined from the winding end, through the jumper to the second terminal branch to the second terminal, and
   wherein the first electrical conduction path has an electrical resistance substantially equal to that of the second electrical conduction path for electrical load balancing from the winding end to the first and second terminals.

2. The electric machine as recited in claim 1, wherein the first electrical conduction path has a length substantially equal to that of the second electrical conduction path.

3. The electric machine as recited in claim 1, wherein a first main branch of the jumper is defined from the main base end to the second end of the jumper and further comprising:
   a second main branch of the jumper extending from the main base end to a third end of the jumper;
   a third terminal branch having a branch end electrically connected to the third end of the jumper; and
   a third terminal electrically connected to a terminal connection end of the third terminal branch for connecting the stator electrically to a third load;
   wherein a third electrical conduction path is defined from the winding end, through the second main branch of the jumper to the third terminal branch to the third terminal; and
   wherein the third electrical conduction path has an electrical resistance substantially equal to that of the second electrical conduction path for electrical load balancing from the winding end to the first, second, and third terminals.

4. The electric machine as recited in claim 3, wherein the third electrical conduction path has a length substantially equal to that of the second electrical conduction path.

5. The electric machine as recited in claim 3, further comprising:
   a fourth terminal branch having a branch end electrically connected to the third end of the jumper; and
   a fourth terminal electrically connected to a terminal connection end of the fourth terminal branch for connecting the stator electrically to a fourth load;
   wherein a fourth electrical conduction path is defined from the winding end, through the second main branch of the jumper to the fourth terminal branch to the fourth terminal; and
   wherein the fourth electrical conduction path has an electrical resistance substantially equal to that of the third electrical conduction path for electrical load balancing from the winding end to the first, second, third, and fourth terminals.

6. The electric machine as recited in claim 5, wherein the fourth electrical conduction path has a length substantially equal to that of the second electrical conduction path.

7. The electric machine as recited in claim 5, wherein the stator winding is a first stator winding, wherein the winding end is a first winding end, wherein the jumper is a first jumper, and further comprising:
   a second stator winding in the stator having a second winding end; and
   a second jumper including a respective main base end connected to the second winding end, wherein the second jumper includes a respective first terminal branch, a respective first terminal, a respective second terminal branch, and a respective second terminal as recited in claim 1 for the first jumper.

8. The electric machine as recited in claim 7, further comprising:
a third stator winding in the stator having a third winding end; and
a third jumper including a respective main base end connected to the third winding end, wherein the third jumper includes a respective first terminal branch, a respective first terminal, a respective second terminal branch, and a respective second terminal as recited in claim 1 for the first jumper.

9. The electric machine as recited in claim 8, wherein the second jumper includes:
a respective second main branch, a respective third terminal branch, a respective third terminal, a respective fourth terminal branch, and a respective fourth terminal as recited in claim 8 for the first jumper.

10. The electric machine as recited in claim 9, wherein the third jumper includes:
a respective second main branch, a respective third terminal branch, a respective third terminal, a respective fourth terminal branch, and a respective fourth terminal as recited in claim 8 for the first jumper.

11. The electric machine as recited in claim 10, wherein the first terminals of the first, second, and third jumpers are circumferentially aligned, wherein the second terminals of the first, second, and third jumpers are circumferentially aligned, wherein the third terminals of the first, second, and third jumpers are circumferentially aligned, and wherein the fourth terminals of the first, second, and third jumpers are circumferentially aligned.

12. The electric machine as recited in claim 11, wherein the first winding end is circumferentially offset from the second winding end, and wherein the third winding end is circumferentially offset from both of the first and second winding ends.

13. The electric machine as recited in claim 12, wherein each of the first, second, and third jumpers conforms to a portion of a ring shape extending circumferentially around the stator.

14. The electric machine as recited in claim 13, wherein at least one of the first, second, and third jumpers includes a U-turn section wherein the first main branch circumferentially folds back on itself.

15. The electric machine as recited in claim 13, wherein at least one of the terminal branches overlaps circumferentially over its own respective main branch.

\* \* \* \* \*